July 9, 1963  C. J. FECHHEIMER  3,097,317
LIQUID-COOLED ELECTRIC GENERATOR
Filed May 5, 1960  3 Sheets-Sheet 1
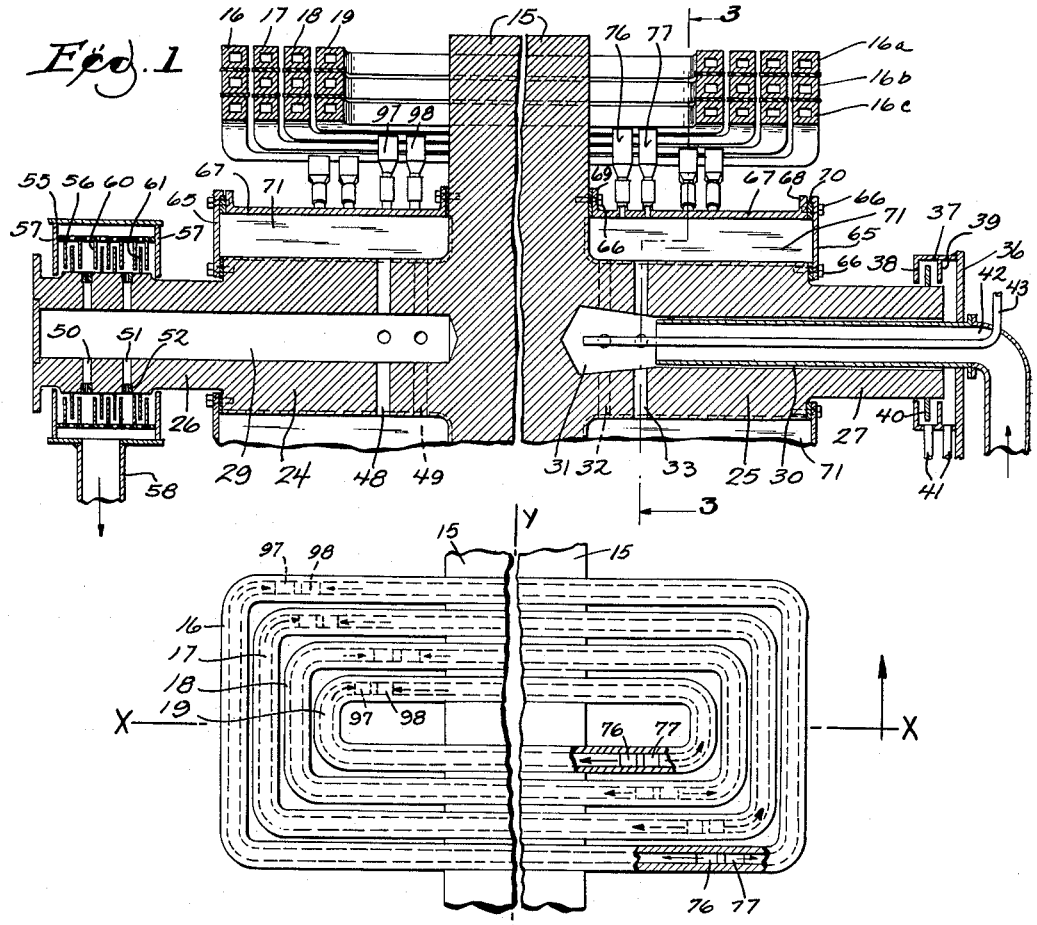
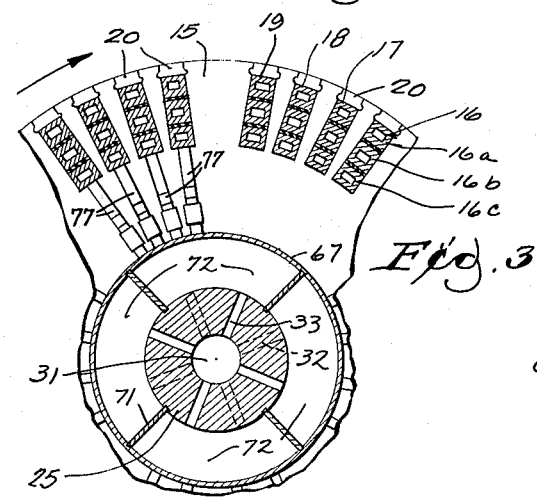
INVENTOR.
CARL J. FECHHEIMER
BY
Miles Henninger
ATTORNEY July 9, 1963 C. J. FECHHEIMER 3,097,317
LIQUID-COOLED ELECTRIC GENERATOR
Filed May 5, 1960 3 Sheets-Sheet 2

INVENTOR.
CARL J. FECHHEIMER
BY
Miles Henninger
ATTORNEY

July 9, 1963 C. J. FECHHEIMER 3,097,317
LIQUID-COOLED ELECTRIC GENERATOR
Filed May 5, 1960 3 Sheets-Sheet 3
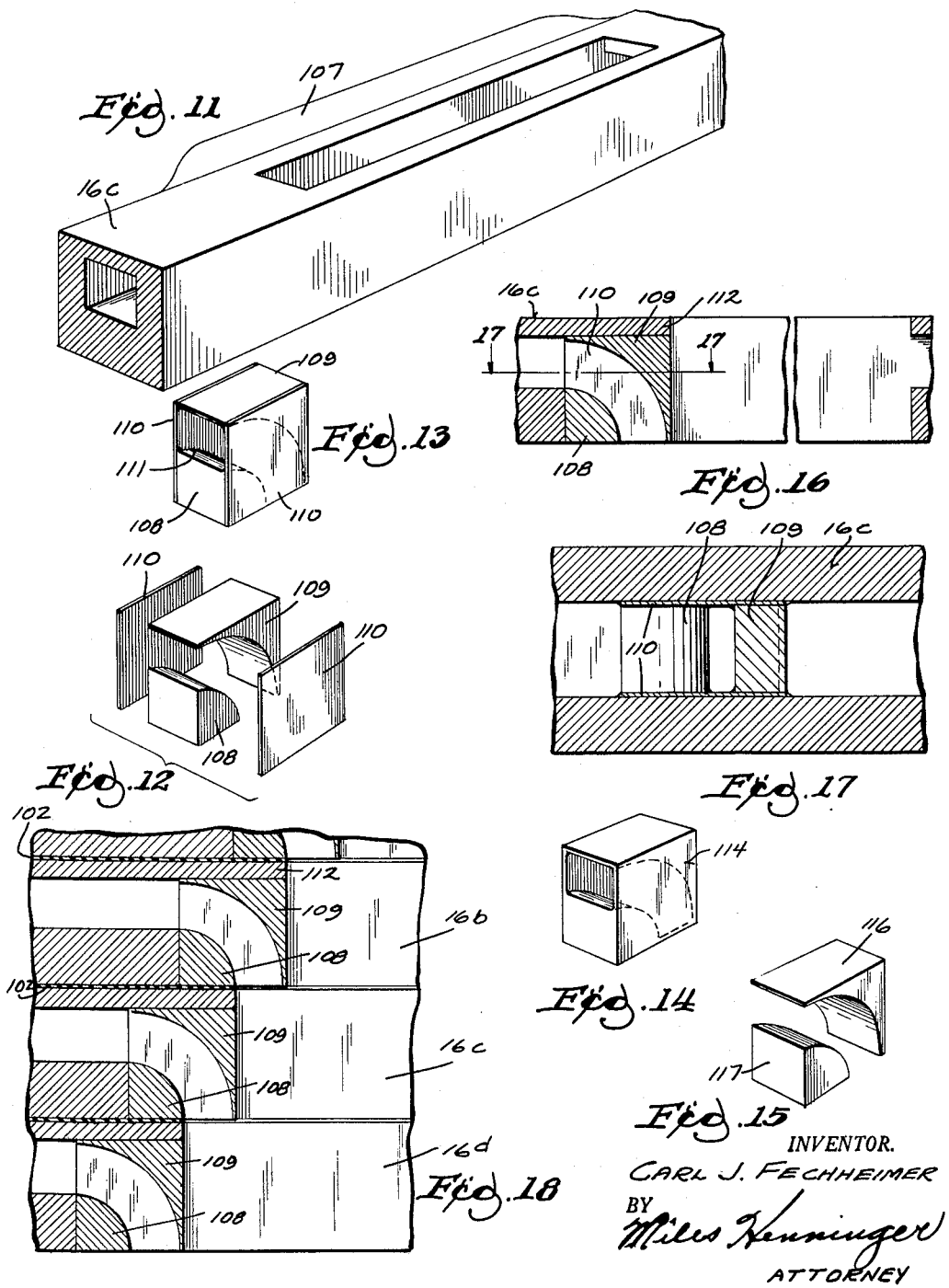

United States Patent Office 3,097,317
Patented July 9, 1963

3,097,317
LIQUID-COOLED ELECTRIC GENERATOR
Carl J. Fechheimer, 1930 N. Prospect Ave.,
Milwaukee, Wis.
Filed May 5, 1960, Ser. No. 27,222
16 Claims. (Cl. 310—54)

This invention relates to improvements in the rotors of alternating-current high speed dynamo-electric machines, particularly of large kilowatt capacity, which are to be cooled by the flow of a liquid coolant through ducts within the conductors of the electrical windings.

The rotors of large electric generators driven by steam or gas turbines usually have 2 poles and, for 60 cycle output, revolve at 3600 r.p.m. In practice, such generators are cooled by a gas flowing through ducts in the windings, the gas being generally hydrogen which is usually furnished under relatively high pressures. Stators of such machines have also been cooled by such gas or by a liquid, also flowing through ducts in the windings.

It has long been recognized that liquids are far superior to gases for cooling. The gains effected by a liquid coolant over a gas coolant are two fold as shown by the following comparisons between water and hydrogen, the hydrogen being at 3 atmospheres pressure (the gas pressure most frequently used in large generators), (1) the quantity of heat absorbed by water per unit volume per degree rise in temperature is about 1200 times the heat absorbed by hydrogen, and (2) the rate at which heat is transferred from a metal surface to the water is about 175 times that of hydrogen, velocities being equal. The high heat absorption rate is of especial concern to engineers. For large generators, the coolant must flow a considerable distance, and the temperature of a gas may become so high that it is not effective as a coolant. With water, the very high heat absorption makes possible flow for large distances, absorbing heat all the way, while the water remains at such temperature as to be effective as a coolant. Although, as herein applied, the rate of coolant flow and velocities are considerably less for water than for hydrogen, the thermal gains with water over hydrogen are large. It is noteworthy also that the calculations of temperatures involving a liquid coolant are simpler than for gas cooling.

In nearly all A.C. turbine generators the heating of the rotor copper due to the large loss therein (excitation $I^2R$ loss) has limited the k.v.a. rating for a given rotor body diameter and length. Conversely, rotor heating has limited possibilities of reduction in rotor dimensions for a given k.v.a. rating. This difficulty was recognized previously and patents, Numbers 2,285,960, 2,381,122, 2,527,878 and 2,618,756 were issued to me for liquid cooling of turbine generators.

The above patents disclose means and methods for liquid cooling of rotors by causing liquid flow through the steel, usually the rotor teeth. Cooling of the rotor steel is then not so effective that only about 15 percent of the total copper temperature rise is from the steel, the remaining 85 percent being the temperature drop through the insulation wall in the rotor body slot. If the copper is cooled directly by a suitable liquid flowing through channels in the rotor conductors, the thermal drop through the insulation is eliminated, and the temperature rise for a given kw. excitation loss is greatly reduced; or the rating can be increased for the same temperature rise with more excitation kw. The problem has been to get the liquid into the hollow rotor conductors, and to have it flow through the conductors and discharge, without giving electrical or mechanical troubles, without liquid leakage, and without use of rubbing seals.

Consideration must be given to whether the liquid is to be brought into the rotor at one end and be discharged from the same end, or is to be discharged from the other end. If the liquid is brought in and discharged from the same end as shown for example in British Patent 16,986 of 1914 to Parsons (wherein the inlet is a stationary pipe extending into a bore in the rotor shaft and the discharge is through an annular space between the bore and such pipe), the discharge liquid is pressed to the rotating wall of the bore by centrifugal force which causes the liquid to rotate, so that the discharge flow path is actually a helix. Hence the discharge is greatly impeded, and relatively high pressure is required to secure adequate flow of liquid through the rotor. Further, a seal of some kind must be placed between the liquid entrance and the liquid discharge paths and, in constructions where the entry and discharge of liquid are to be from the same end, the seal would have to be placed near the inner end of the liquid entrance pipe and would be difficult to install, maintain or replace. Such seal would require rubbing surfaces which are unlikely to remain liquid-tight indefinitely.

In any arrangement for entry and exit of liquid at the same end, all the pressure has to be generated by an external pump as there is then no portion of the rotor itself which could be made to act as a centrifugal pump. Hence it will be seen that entry of liquid at one of the rotor and discharge thereof from or near the other end of the rotor is the only practical way of securing adequate flow, and with a minimum of manufacturing and maintenance expense.

The liquid cannot be brought into or discharged from those portions of the conductors within the rotor body slots, nor at the outermost diameter of a winding, but should be brought into the conductors (or discharged from the conductors) in the coil ends. Liquid could be brought into or discharged from, a duct in the conductors of each coil as a unit with:

(a) The duct in all turns of each coil hydraulically in series, or (b) Each turn forming a separate hydraulic unit, or (c) Each half turn forming a separate hydraulic unit with the half turns hydraulically in parallel.

It is also necessary to consider where the hydraulic connection should be made, that is outside of the rotor body:

(d) At the curved end portions or on the straight end portions of the turns, or (e) At a side or the bottom of a coil.

If all turns of each coil are hydraulically in series, the liquid flow path becomes exceedingly long and both large duct cross-section area in the conductors and high velocity flow therethrough are required to secure sufficient heat absorption by the coolant to keep the whole length of the coil at satisfactory and nearly uniform temperature. (For example, in a rotor body 250" long with 7 turns per coil, the total mean length of the coil is about 4200". Each turn is about 600" in length and a half turn is only 300" in length.) Also, if all turns of each coil were hydraulically in series the liquid must then enter and discharge at the same end of the rotor which subjects this construction to some of the same objections as stated above.

If each turn of a coil forms a separate hydraulic unit, the liquid must also enter and discharge from the same end of such turn, which is objectionable. Also, the liquid would have to enter and discharge from the same end of the rotor which is objectionable as previously described. Further, in this case, large duct sections and high velocity of flow would be required to keep the temperature low enough.

If each half turn is a hydraulic unit and all of the half turns are hydraulically in parallel, the liquid can enter at one end of the rotor and discharge from the other end of the rotor. Hence it will be obvious that a half turn is the least practical length and therefore is susceptible to a minimum duct size in the conductors, minimum flow velocity, minimum temperature rise and an approach to practical maximum temperature uniformity throughout the length of one entire portion of the conductor.

Considering now the possibility of making the hydraulic connections from the rotor bore to the conductors at the curved winding end portions (as compared to connection with the straight winding end portions), the connections at the curved end portions of the turns are impractical because the Coriolis forces which are in tangential direction, will aid flow in one direction from the hydraulc connection, and will hinder flow in the other direction. Hence one portion of the conductor would receive a maximum flow of liquid and be unnecessarily cool while the other portion of the conductor would receive a minimum flow of liquid and would be too hot.

Consider now making the hydraulic connections at the sides of the conductors (as contrasted to making the connections at the bottoms of the conductors, i.e. the surface of the conductors nearest the rotor axial center line). For such side connections, two 90° bends would be required per connector, one to change from radial to tangential and one to change from tangential to axial directions of flow. There would have to be as many such double bends as there are hydraulic entrances to an hydraulic exits from the conductor ducts. Each 90° bend requires guides to assure smooth liquid flow and avoidance of Coriolis forces which would impede the flow. But, when the hydraulic connections are made at the bottom of the conductors of each coil, only one 90° bend is required per connector at each hydraulic entrance to and hydraulic exit from the conductor ducts. Such single bend can be readily made by guides inserted in the conductor duct itself and do not complicate the connector structure.

It is accordingly an object of the present invention to provide a structure which will secure flow of an adequate volume of liquid coolant to and through ducts in the rotor windings of a high-speed high k.v.a. rating dynamo-electric machine.

Another object of the invention is to secure such volume of liquid coolant flow smoothly and at moderate pressure and velocity, through the shaft of a dynamo-electric machine and to and though the conductors of the rotor windings and back through the shaft, from which the coolant is then discharged.

Another object of the invention is to provide means for supplying the various conductors of each winding on the rotor of a dynamo-electric machine with substantially the same amounts of liquid coolant so that no material temperature differences exist between the conductors closest and those farthest away from the axis of the rotor when the machine is operating under load.

Another object of the invention is to provide a structure for liquid cooling the body and windings of the rotor of an electric generator in which the flow of coolant is easily adjusted to the loading of the generator, and without leakage of the liquid.

In the drawings,

FIG. 1 is a somewhat diagrammatic longitudinal section through a portion of the rotor of a dynamo-electric machine according to the present invention;

FIG. 2 is a developed view of one set of pole windings;

FIG. 3 is a fragmentary cross-sectional view on the line 3—3 of FIG. 1;

FIG. 11 is a perspective view of a fragment of a conductor with a duct longitudinally therethrough and with an aperture in the bottom and top surfaces thereof and a conductive bar attached to one side to compensate for the material removed in forming the apertures;

FIG. 12 is an exploded view of a guide vane structure to be inserted in the duct through the conductor;

FIG. 13 is a perspective view of a guide vane structure of FIG. 12 assembled by soldering, welding or the like;

FIG. 14 is a perspective view of a guide vane structure made as a casting to be inserted in the duct in a conductor;

FIG. 15 is a perspective view of a guide vane construction without side parts, to minimize reduction in cross-sectional area of the duct in a conductor;

FIG. 16 is a longitudinal vertical section of a conductor fragment with a guide vane in place therein;

FIG. 17 is a section taken on the line 17—17 of FIG. 16; and

FIG. 18 is a section taken radially of a rotor and through a number of turns of one coil to show how the liquid flow is distributed by the different guide members in several conductors electrically in series.

Figure 4:
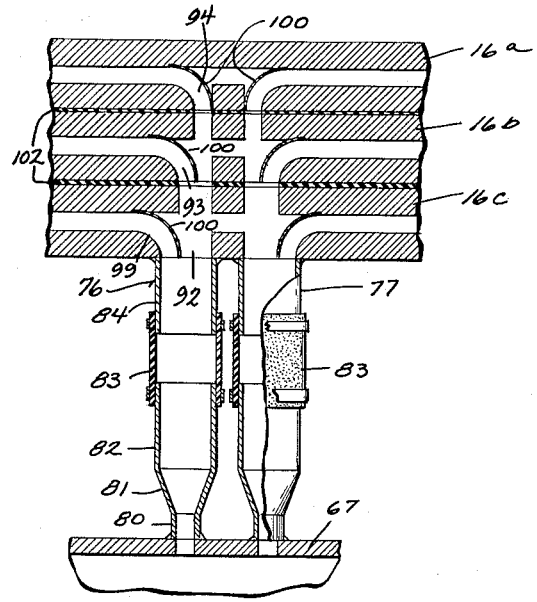
FIG. 4 is a fragmentary longitudinal section showing the ports and passages for liquid flow to or from a distributing chamber through connections and through the windings.

Referring specifically to the drawings, numeral 15 designates the steel body of the rotor of a dynamo-electric machine such as a generator for several hundred thousand kw. capacity, such generators usually being driven by steam turbines at 3600 r.p.m. for 60 cycle electric current output, although the invention is applicable to lower speed machines also. The rotor body 15 is formed with groups of radial slots in which are imbedded electrical windings 16, 17, 18 and 19, each formed from a number of hollow copper conductors to be specifically described, the windings being retained in the slots by wedges 20. Shafts 24, 25 are integral with and extend from the rotor body and have reduced diameter end portions 26, 27 by which the rotor is supported in the usual bearings. Longitudinal bores 29, 30 extend axially from the outer ends of the shafts to approximately the planes of the ends of the rotor body 15. Considering bore 30 as the inlet bore for liquid-coolant flow, such bore may be formed with a tapered enlargement or pocket 31 at the inner end of the port. Smaller bores 32, 33 in spaced relation, extend radially outwardly through the shaft portion 25 from the pocket 31.

A catch basin and seal structure comprises a stationary plate 36 adjacent the outer end of the right hand shaft 25, 27 and has attached thereto a drum 37 with an end 38 flanged inwardly toward the shaft and with an internal flange 39 also extending toward the shaft but spaced from the flange 38. A flange 40 is mounted on the shaft portion 27 and extends between the two drum flanges 38, 39 in spaced relation to form a seal for liquid, the seal being without surfaces rubbing on other surfaces at any point, and being effective by centrifugal force throwing liquid off flanges 40. The supporting plate drum and flange structure described above, forms a catch basin for any liquid leaking from the outer ends of the shaft 25, 27 and such liquid flows to a sump by way of drains 41. A stationary conduit 42 extends through the catch basin 36—41 for supply of liquid under pressure to the bore 30, the conduit fitting relatively closely into the shaft to minimize leakage about the conduit. A tube 43 extends through the conduit 42 for venting air or other gases from the pocket 31 as such gases are released from the liquid coolant, due to differences between centrifugal action on the liquid and gases, in flowing from the conduit 42 into the larger cross-section pocket 31. Hence, practically solid streams of coolant flow into bores 32, 33 which act as centrifugal pumps.

Figure 8:
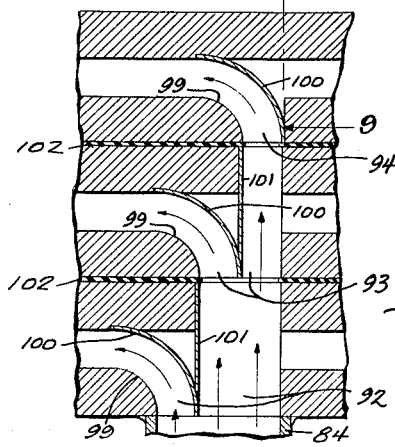
FIG. 8 is an enlarged fragment of a longitudinal section through a portion of a winding and showing the relationships of the ports and passages in the several conductors therein.

The bore 29 of left hand shaft 24, 26 also has radial bores 48, 49 therefrom adjacent the inner end of the port and radial bores 50, 51 therefrom adjacent the outer end of the bore 29, both sets of such bores conveying the liquid coolant after its flow through windings 16—19. The centrifugal forces generated in the liquid between the pocket 31 and the windings 16—19 are substantially equal and opposite to the centrifugal forces between the windings and the bore 29 at the other end; that is, they are balanced. The combination acts hydraulically like a pump and a turbine. Centrifugal forces are generated in the bores 50 and 51, which are not balanced by other forces and act as centrifugal pumps to generate most of the pressure causing liquid flow through the ducts in the windings. The pressure supplied at the entrance bore at the right hand end is sufficient to only approximately overcome the hydraulic resistance of the several ducts, so that the pressure in bore 29 is not far from atmospheric pressure. Such supply pressure may be secured by gravity, the liquid being fed from an external elevated tank, as shown in FIG. 8 in Patent 2,527,878. Orifice plugs 52 in the bores 50 and 51 limit and control the flow, each plug being provided with an orifice, the orifice diameters being different for each set of plugs and the screw-in plugs being readily interchangeable.

A stationary collecting chamber incloses a portion of shaft end 26 and includes an outside cylinder 55, in spaced relation to an inside perforated cylinder 56, and end side walls 57 extending closely adjacent to the outside of shaft 29. The perforations in cylinder 56 are preferably on axes in line with the diagonals of parallelograms of velocities of discharge from orifices 52. The inside cylinder 56 supports a number of spaced flange rings 60 interleaved in spaced relation with flange rings 61 attached to the shaft 29. Flanges 60, 61 are in groups between radial bores 50, 51 and between such bores and the ends 57 of the casing 55. The rotating flanges 61, by virtue of centrifugal forces acting on the liquid, throw off the liquid through the holes in the inside perforated cylinder 56. The liquid collects in the annular space between the outer and inner cylinders and is drained off through the pipe 58 which is preferably tangential to cylindrical wall 55. Thus, the above structure also forms a seal for liquid discharged from the radial bores 50, 51 and is free from rubbing sealing surfaces. One reason for enlarging the shaft is to compensate for the weakening due to the bores 50 and 51.

A distribution chamber is formed about each of the shaft portions 24 and 25 and each such chamber comprises an annular end plate 65 secured to a shoulder on the shaft by screws 66, and a cylindrical wall 67 to provide an annular enclosure about such shaft portion. The chamber cylindrical wall 67 is formed in shallow U-shape to provide flanges 68 and 69 at its peripheral edges. Flange 68 serves to secure the cylindrical wall 67 to the end plate 65, while flange 69 is attached to the end of the rotor body 15, both flanges 68, 69 being attached as by screws 66 (or by welding, hard soldering, brazing) and all of the chamber joints including a gasket 70 of suitable material such as sheet lead. Grooves are formed longitudinally of the shaft portions 24, 25 and continued into the ends of the rotor body 15 for severally receiving partitions 71 which are preferably slightly over-size and are held firmly seated when all screws 66 are drawn up tightly to seal the chamber joints. Such partitions 71 divide the distribution chambers into a number of compartments 72 (see FIG. 3) which prevent the whirling of liquid in such chambers with respect to the rotor when the rotor is at full speed. The partitions 71 need not be sealed to the rotor body and shafts or to the chamber walls as a small amount of leakage between compartments is immaterial.

Each compartment 72 has joined therewith one or more sets of connectors 76, 77 or 97, 98 as shown in FIGS. 1, 2, 3 and 4 and each of such connector sets is joined with ducts formed in the conductors of a group of windings. Each group of windings has four connectors joined therewith as shown in FIG. 2, the connectors 76, 77 being for flow of liquid from the distributing chamber on the inlet side of the rotor to the winding and the connectors 97, 98 from the winding to the distributing chamber at the outlet end of the rotor being for discharge of coolant from the windings. Thus winding 19 has connected therewith connectors 76, 77 from the inlet distribution chamber 72 and connectors 97, 98 connect such winding with the outlet distribution chamber 72. The connectors are attached to those end portions of winding 19 beyond the rotor body 15 and extending longitudinally of the rotor rather than in the winding ends extending circumferentially of the rotor, for reasons given above.

All connectors at one end of the rotor are in a particular position relative to the windings, as illustrated in FIG. 2 wherein a winding is divided into four quadrants by a plane X axially of the rotor and a plane Y at right angles thereto and through the center of the rotor longitudinal axis. The quadrant occupied by the connectors depends on the direction of rotation of the rotor. In FIG. 2 it is assumed that the rotor turns clockwise when looking at the rotor from the inlet end thereof. Hence all inlet connectors 76, 77 for all windings 16—19 are in the lower right hand quadrant of FIG. 2 and all outlet connectors 97, 98 for all windings are in the upper left hand quadrant of FIG. 2. In such positions the forces acting on the coolant due to acceleration of the rotor from standstill to fullspeed, also accelerate flow of coolant into the windings at the inlet end of the rotor and accelerate flow of coolant out of the windings at the outlet end of the rotor. If the above relationship of position of the connectors and direction of rotation is not followed, the forces due to acceleration of the rotor would oppose the desired direction of flow and would require much higher external pressure on the coolant than when the relationship is followed. Of course, direction of rotation opposite that indicated above requires opposite positioning of the connectors. Thus for counter-clockwise rotation, inlet connectors 76, 77 would have to be in the upper right hand quadrant and outlet connectors 97, 98 would have to be in the lower left hand quadrant of FIG. 2. Such placing of the connectors does not produce mechanical unbalance of the rotor because the connectors to the windings of one pole are balanced by the diametrically opposite connectors to the windings of the other pole.

By reference to FIG. 4, it will be seen that each of the connectors 76, 77 and 97, 98 comprises a cylindrical portion 80 for attachment in or about a circular hole in the cylindrical wall 67 of a distributing chamber 72, a portion changing from cylindrical cross-section 80 to rectangular cross-section 82, and an elastic and flexible tubular portion 83 connecting rectangular portion 82 with rectangular portion 84. The connector tubes 80–82 and 84 are metallic so that they can be brazed, welded or soldered to the metallic wall 67 of a distributing chamber and to the copper of a winding conductor while the tube 83 is of electrical insulation such as one of the synthetic resins which is durable, flexible, somewhat elastic and of sufficient dielectric strength to insulate the windings from the rotor body.

Figure 5:
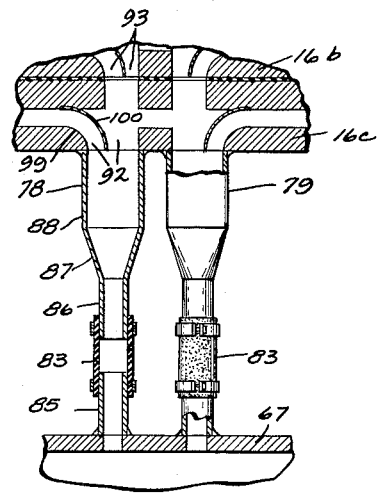
FIG. 5 is a view similar to FIG. 4 showing a modified form of connector.
Figure 6:
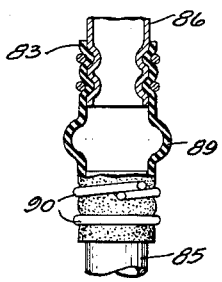
FIG. 6 is an enlarged cross-sectional view of a portion of one of the connectors.

In FIG. 5, the location and proportioning of the various connector parts are similar to those described for FIG. 4, the arrangement of such parts being slightly different to facilitate manufacture and assembly. Thus connector portions 85, 86 are cylindrical, portion 87 changes from cylindrical to rectangular cross-section and portion 88 is rectangular. The metallic tubular portions 82, 84 and 85, 86 of the connectors to be attached to the insulating tube 83 are preferably grooved as indicated in FIG. 6 and the insulation tube 83 is formed to fit into such grooves and to have an enlarged portion 89. Suitable clamps are used to attach and seal insulation tube 83 to the metallic tubes 82—86 and such clamps may be expandable-contracting spring rings 90 seated in the grooves over the insulating tube, the ends of such rings being preferably staggered to avoid leakage of the coolant. The enlarged central portion 89 of the insulating tube 83 allows for change in the distance of the windings 16—19 from the distributing chambers 65—71 due to centrifugal force when the machine is operating as opposed to such distance when the machine is at a standstill. Distribution chambers 65—71 could be omitted and connectors 76—77 and 97, 98 could be joined directly with radial shaft bores. However, such large numbers of radial bores would weaken the shaft and otherwise complicate construction.

For sake of simplification in FIGS. 1, 2 and 3, only four coils per pole are shown, whereas, more than four are usual. And in FIGS. 1, 3, 4 and 8 only three conductors per winding are shown. Ducts in all of the conductors of each winding group are joined to a connector by removal of part of one wall of each conductor to provide port-passages 92, 93 and 94 (see FIGS. 4 and 8) into all conductors, and through all conductors excepting the one farthest away from a distributing chamber 65—71. As shown for three conductors in FIGS. 4 and 8, if the cross-sectional area of the port-passage into one conductor is considered as a unit area, the port-passage 92 is substantially three times the unit area, port-passage 93 is substantially two times the unit area and port-passage 94 is substantially equal to the unit area. Liquid flows from connectors 76, 77 into each conductor as at 19a–c of each winding and such flow is guided in opposite directions around the windings and discharged through two other connectors 97, 98 as shown by arrows in FIG. 2. Each conductor port has one edge rounded or sloped as indicated at 99 and a flow guide vane 100 is fixed in such bore and at such location as to provide an inlet to its conductor duct of substantially the area and shape of the duct. If desired, each guide vane, except the outermost, may have a plate 101 attached thereto and to the conductor (see FIG. 8) to support the guide vane and to avoid turbulence otherwise occurring back of each guide vane. It will be seen in FIG. 8 also that the insulation 102 between the conductors protrudes slightly from the edges of the port-passages 92—94.

The voltage difference between adjacent rotor conductors is only the IR drop per turn, and is necessarily low. Even with a slightly electrically conductive liquid, such as water treated with a corrosion inhibitor, the electric current that might be conducted between consecutive winding turns through the liquid would be very small. (If the voltage were generated between turns by electromagnetic induction, as in the coils of an armature, the same voltage might be serious.) Further, to mitigate the leakage of current between turns, a suitable insulating varnish or resin which can withstand the temporary elevated temperature incident to soldering in place of the guides, can be applied to parts that will be exposed later to the liquid. Another way to avoid current flow between conductors is to use distilled water for the coolant, and galvanize those steel parts in contact with the liquid. The insulation between consecutive turns (conductors) should have such properties that, when suitably cemented to the conductors, no liquid (under the pressure generated by centrifugal force) will seep or creep through the insulation and escape from the outside. The centrifugal forces due to rotation of the conductors will cause radial pressure to be exerted upon this insulation and thereby assist in prevention of liquid escape. It will be understood that the conductor ports and passages joined with discharge connectors 97, 98, also have the above guide vane construction to improve liquid flow from the conductors.

The guides 99 and 100 are needed to mitigate the harmful effects of Coriolis forces. The Coriolis acceleration is well known to be $2wXV$, where $w$ is the rotor's angular velocity and $V$ is the liquid's relative radial velocity in the duct, the X denoting vector multiplication. The Coriolis force per unit volume is the above acceleration multiplied by the liquid's mass density. The optimum radii for the guides 99 and 100 is best determined experimentally on a model. The guide vanes 100 are preferably secured by soldering to the conductor and the conductor duct-wall portion removed to make it possible to attach the guides, may be replaced with equivalent pieces of conductor opposite the port-passages, which may be soldered to the conductor with low melting point silver-solder. To assure the same total conductive metal section, the replacement metal might be a little thicker than the original portion removed.

Figure 7:
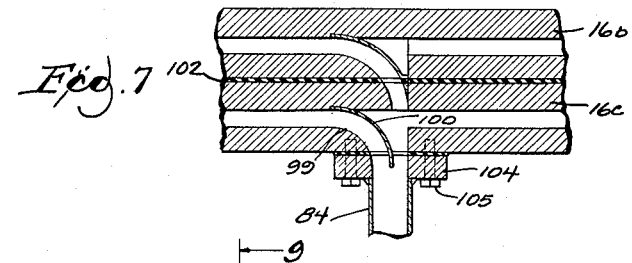
FIG. 7 is a fragmentary view of a modified structure similar to that shown in FIGS. 4 and 5.

FIG. 7 shows a modified construction in which the connector portion 84 is brazed or welded to a plate 104 which is attached by screws 105 to conductor 16c, for the purpose of providing sufficient material so that larger radii can be used for the conductor guide edges 99 and the guide vanes 100 to achieve smoother flow of liquid around the bends. The length of the path for liquid flow is so great as compared with the distance from innermost to outermost conductor, that there is very little difference between the total resistance to flow between those locations, hence but little difference in rate of liquid flow between the inner and outer conductors of a winding. It will be seen in FIG. 2 that the length of path of flow is different for the several coils per group, which produces different hydraulic resistances and therefore slightly different velocities and volume of flow of liquid in the several coils. If it is desired to equalize velocities and flow, orifices can be installed in the ducts of the shorter coils whereby loss of hydraulic head equalizes flow in the coils.

Figures 9, 10:
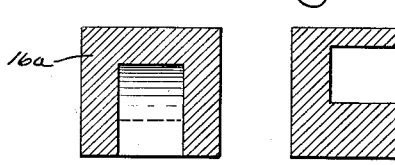
FIG. 9 is a cross-section of one conductor taken on the plane of line 9—9 of FIG. 8.
FIG. 10 is a view showing an offset duct in a conductor.

FIG. 9 shows a cross-section through one conductor 16a on the line 9—9 of FIG. 8 and shows the duct therein in substantially axial position in the conductor while FIG. 10 shows the duct offset from the conductor axis. The offset duct of FIG. 10 has the advantage that larger radii guide vanes can be used than for the centrally located duct, without use of a large thickness for plate 104 as shown in FIG. 7.

When the conductors forming a coil have apertures cut through both the bottom and top walls as shown in FIG. 11, the cross-sectional area of the copper available for flow of electric current is substantially reduced and such reduction of material cross-section could lead to the development of "hot spots." Hence I prefer to compensate for such reduction in conductor cross-section by soldering or welding to one or both sides thereof a bar or bars 107 which are at least equal in cross-sectional area to the amount of metal removed by cutting the apertures in the conductor. It will be noted that, except for the outermost conductor, the apertures are considerably longer than the length of one guide vane structure such as shown in FIGS. 12, 13, 14 and 15, the length of the apertures being approximately equal to sum of the lengths of the guide vane structures as shown in FIG. 18.

FIGS. 12 and 13 show a guide vane structure comprising a sector-shaped piece 108 and an arcuate-shaped piece 109, which are preferably cut from a piece of conductive material of which the size, together with side plates 110, which will allow passage of the completed guides through the apertures in the conductors and seating in the conductors to form elbows for guiding the flow of liquid into a duct in the conductor. As shown in FIG. 13 by the fillets 111, the guide parts 108—110 are preferably joined by hard soldering or the like to make a unit which will exactly fit into the conductor between the insulation 102 and the conductor portion 112 (see FIG. 18). Each guide vane structure is then preferably soldered or welded in place so that the guide vane is firmly held when the winding is being assembled in the rotor body and is in use. It will be understood that rivets or the like may also be used to join the guide vane parts with the conductors.

FIG. 14 shows a guide vane made as an integral casting 114, the arc and the dimensions of the elbow passage being such that power tools may be used to clean and polish the liquid guiding surfaces. If a conductor duct is of such size that it is undesirable to reduce the duct area by the thickness of the side plates 110 or side piece portions of the casting 114, the pieces 116 and 117 (see FIG. 15) can be cut from a bar of just the size to fit into the duct and can then be fastened therein by soldering, brazing or welding. It will be seen that all complete guide vanes and both pieces 116 and 117 are accessible along several surfaces for soldering or the like through the conductor apertures, which is sufficient to keep such pieces in place. However, if desired it is always possible to pass rivets or their equivalents through the side of a conductor and the guide parts to assure against shifting of the guides under any normal manufacturing or operating conditions.

It will be seen that the present invention provides a rotor construction for an electric generator, and especially for a rotor to be driven at relatively high speed, by which a liquid coolant is used for direct or so-called inner conductor cooling of the electrical windings. Axial and radial bores in one rotor shaft serve as liquid supply passages and similar bores in the other rotor shaft serve as liquid discharge passages. The ends of both shafts are sealed against leakage by a seal free from rubbing surfaces. Lengthwise ducts in all of the conductor turns constituting a winding, are connected by ports and passages with curving guides providing inlet and outlet passages into each conductor of substantially the area of the conductor longitudinal duct. Such guides greatly mitigate the Coriolis forces occurring where liquid flow makes a 90° bend. At least one inlet and one outlet port are provided for each winding but it is preferable to provide pairs of ports so that flow of coolant is divided into two streams each passing through one-half the length of each turn of conductor. The radial shaft bores discharge into chambers around portions of the shafts and such chambers are partitioned longitudinally of the shafts to prevent or reduce swirling of water in the chambers during rotation thereof. The chamber walls may be attached to the rotor body and shafts by screws or equivalent means which clamp the chamber partitions in place and exert sufficient pressure on the chamber gaskets or may be attached by welding to the rotor. Insulated tubes connect the inlet and outlet ports of the winding to the chambers and severally have flexible and elastic sections compensating for changes in spacing of parts during operation of the rotor.

This is a continuation-in-part of S.N. 821, filed January 6, 1960, and now abandoned.

I claim:

1. In an electric generator rotor comprising a body with shafts extending therefrom, the shafts having axial bores and radial bores from the axial bores for conveying a liquid coolant, electrical windings mounted in the body and each including a number of turns of electric conductor each conductor having ducts lengthwise thereof and ports radially of the body and into the ducts from the bottom of the windings, and tubular connectors severally joining the radial shaft bores with the ports in the windings for delivery thereto and discharge therefrom of liquid coolant.

2. In an electric generator rotor comprising a body with shafts extending therefrom, the shafts having axial bores and radial bores from the axial bores for conveying a liquid coolant, electrical windings mounted in the body and each including a number of turns of electric conductor, each conductor having ducts lengthwise thereof and ports radially of the body and into the ducts from the bottom of the windings, the ports being in the straight winding end portions and at least one tubular connector joining each portion of a winding with a radial shaft bore for liquid coolant delivery to and discharge from the respective winding end portions.

3. In an electric generator rotor comprising a body with shafts extending therefrom, the shafts having axial bores and radial bores from the axial bores for conveying a liquid coolant, electrical windings mounted in the body and each including a number of turns of electric conductor, each conductor having ducts lengthwise thereof and a pair of ports radially of the body and into the ducts of the several conductors of a winding, the ducts being divided at the ports for flow of liquid coolant in opposite directions respectively from and to the ports, and tubular connectors severally joining the radial shaft bores with the ports in the windings.

4. In an electric generator rotor comprising a body with shafts extending therefrom, the shafts having axial bores and radial bores from the axial bores for conveying a liquid coolant, electrical windings mounted in the body and each including a number of turns of electric conductor, each conductor having ducts lengthwise thereof and ports radially of the body into the ducts, the port surfaces being curved to guide liquid flow into and out of the ducts, chambers severally about the shafts and divided into compartments connected with the radial shaft bores for delivery and discharge of liquid coolant to and from the bores, and tubular connectors severally joining the chambers with the ports in the windings for delivery thereto and discharge therefrom of liquid coolant.

5. In an electric generator rotor comprising a body with shafts extending from two ends thereof, the shafts having axial bores and radial bores from the axial bores for conveying a liquid coolant, electrical windings mounted in the body and each including a number of turns of electric conductor, each conductor having ducts lengthwise thereof and ports into the ducts, each winding having at least two ports and the ports being severally connected with the ducts in a winding for delivery thereto and discharge therefrom of liquid coolant, the port surfaces being curved to guide liquid flow to and from a direction substantially along the axis of the ducts, and sets of tubular connectors severally joining the radial bores in the shafts with the ports in the windings for delivery thereto and discharge therefrom of liquid coolant.

6. In an electric generator rotor comprising a body with shafts extending therefrom, the shafts having axial bores and radial bores from the axial bores for conveying a liquid coolant, electrical windings mounted in the body and each including a number of turns of electric conductor, each conductor having ducts lengthwise thereof and ports into the ducts, each winding having at least two ports and each port being connected with the ducts in a winding for delivery thereto and discharge therefrom of liquid coolant, the port surfaces being curved to guide liquid flow to and from a direction substantially along the axis of the ducts, chambers severally about the shafts and divided into compartments connected with the radial shaft bores for delivery and discharge of liquid coolant to and from the bores, and sets of tubular connectors severally joining the chambers with the ports in the windings for delivery thereto and discharge therefrom of liquid coolant.

7. In an electric generator rotor comprising a body with shafts extending therefrom, the shafts having axial bores and radial bores from the axial bores for conveying a liquid coolant, electrical windings mounted in the body and each including a number of turns of electric conductor, each conductor having ducts lengthwise thereof and ports into the ducts, guides for liquid flow into and in the ports, the guides severally extending from the duct sides remote from the axis of the rotor and dividing the ports into areas equal in number to the ducts connected with a port, chambers severally about the shafts and divided into compartments connected with the radial shaft bores, and sets of tubular connectors severally joining the chambers with the ports in the windings for delivery thereto and discharge therefrom of liquid coolant.

8. In an electric generator rotor comprising a body with shafts extending therefrom, the shafts having axial bores and radial bores from the axial bores for conveying a liquid coolant, electrical windings mounted in the body and each including a number of turns of electric conductor, each conductor having ducts lengthwise thereof and ports into the ducts, guide vanes severally extending from the duct sides remote from the axis of the rotor and dividing the ports into areas equal in number to the ducts connected with a port and all of substantially the size of a duct, the guide vanes being curved to turn the flow of liquid coolant into and out of the ducts and mitigate the Coriolis forces due to such turning, chambers severally about the shafts and connected with the radial shaft bores for delivery and discharge of liquid coolant to and from the bores, and tubular connectors severally joining the chambers with the ports in the windings for delivery thereof and discharge therefrom of liquid coolant.

9. In an electric generator rotor comprising a body with shafts extending therefrom, the shafts having axial bores and radial bores from the axial bores for conveying a liquid coolant, electrical windings mounted in the body and each including a number of turns of electric conductor, each having ducts lengthwise thereof and ports radially of the body into the ducts, curved guide vanes extending from a side of each duct into the ducts, the ports having a surface curved to conform with the curvature of the guide vanes to guide liquid flow into and out of the ducts, chambers about the shafts at the ends of the rotor body and divided into compartments severally connected with the radial shaft bores for delivery and discharge of liquid coolant to and from the bores, the compartments being severally formed by an end wall radial to the rotor axis and a cylindrical wall parallel to the rotor axis and partitions dividing the chamber into compartments, the end and cylindrical chamber walls being sealed to the rotor body and the shafts in liquid-tight relation, and sets of tubular connectors severally joining the compartments with the ports in the windings for delivery thereto and discharge therefrom of liquid coolant.

10. In an electric generator rotor comprising a body having grooves in the ends thereof and having coaxial shafts extending therefrom, the shafts having axial bores and radial bores from the axial bores for conveying liquid coolant and having grooves radially in the shafts and joining the grooves in the body ends, electrical windings mounted in the body and each including a number of turns of electric conductor, each having ducts lengthwise thereof and ports radially into the ducts, guide vanes extending from a side of each duct into the ducts, chambers severally about the shafts and divided into compartments connected with the radial shaft bores for delivery and discharge of liquid coolant to and from the bores, the chambers being formed by an end wall radial of the rotor body and a cylindrical wall parallel to the rotor axis and partitions seating in the grooves and held therein by the chamber end walls, and sets of tubular connectors severally joining the compartments with the ports in the windings for delivery thereto and discharge therefrom of liquid coolant.

11. In an electric generator rotor comprising a body with shafts extending therefrom, the shafts having axial bores and radial bores from the axial bores for conveying a liquid coolant, electrical windings mounted in the body and each including a number of turns of electric conductor, each conductor having ducts lengthwise thereof and ports into the ducts, guides extending from the ducts into the ports, chambers severally about the shafts and divided into compartments connected with the radial shaft bores for delivery to and discharge of liquid coolant from the bores, and sets of tubular connectors severally joining the compartments with the ports in the windings for delivery thereto and discharge therefrom of liquid coolant, each connector including metallic portions severally joined with a chamber and a ported portion of a winding and an electric insulating portion joining the metallic portions.

12. In an electric generator rotor comprising a body with shafts extending therefrom, the shafts having axial bores and radial bores from the axial bores for conveying a liquid coolant, electrical windings mounted in the body and each including a number of turns of electric conductor, each conductor having ducts lengthwise thereof and ports radially of the body into the ports, curved guides extending from a side of each duct into the ports for guiding liquid flow into and out of the ducts, chambers severally about the shafts and connected with the radial shaft bores for delivery to and discharge of liquid coolant from the bores, and tubular connectors severally joining the chambers with the ports in the windings for delivery thereto and discharge therefrom of liquid coolant, each connector including metallic portions severally joined with a chamber and a ported portion of a winding and an electric insulating portion joining the metallic portions, the insulating portion being flexible and elastic to compensate for operational variations in spacing between the windings and the chambers, and clamps for securing and sealing the insulating connector portion to the metallic portions thereof.

13. In an electric generator rotor comprising a body with shafts extending therefrom, the shafts having axial bores and radial bores from the axial bores for conveying a liquid coolant, electrical windings mounted in the body and each including a number of turns of electric conductor, each conductor having ducts lengthwise thereof and ports radially of the body and into the ducts from the bottom of the windings, and tubular connectors joining the radial shaft bores with the ports in the windings for respectively delivering liquid coolant to and discharging liquid coolant from the connectors to the shaft bores, the connectors to the ends of the windings for one pole being respectively on opposite sides of the radial center line of the rotor.

14. In an electric generator rotor comprising a body with shafts extending therefrom, the shafts having axial bores and radial bores from the axial bores for conveying a liquid coolant, electrical windings mounted in the body and each including a number of turns of electric conductor, each conductor having ducts lengthwise thereof and ports radially of the body and into the ducts from the bottom of the windings, and tubular connectors joining the radial shaft bores with the ports in the windings for respectively delivering liquid coolant to and discharging liquid coolant from the connectors to the shaft bores, the connectors to the ends of the windings for one pole being respectively on opposite sides of the radial center line of the rotor, the connectors to the ends of alternate pole windings in diagonally opposite quadrants of the winding defined by a plane through the rotor axis and a plane at right angles thereto being so placed that accelerating forces in the ducts assist liquid flow during change in rotor speed from standstill to full speed.

15. In an electric generator rotor comprising a body with shafts extending therefrom, the shafts having axial bores and radial bores from the axial bores for conveying a liquid coolant, electrical windings mounted in the body and each including a number of turns of electric conductor, each conductor having ducts lengthwise thereof and ports radially of the body and into the ducts, the ducts in each conductor in a given winding being divided to provide plural coolant flow paths per conductor in hydraulic parallel, and tubular connectors severally joining the radial shaft bores with the ports into the conductors for delivery thereto and discharge therefrom of liquid coolant.

16. In an electric generator rotor comprising a body with shafts extending therefrom, the shafts having axial bores and radial bores from the axial bores for conveying a liquid coolant, electrical windings mounted in the body and each including a number of turns of electric conductor, each conductor having ducts lengthwise thereof and ports radially of the body and into the ducts, the ducts in each turn of conductor being divided to provide two coolant flow paths in hydraulic parallel in each conductor and of substantially equal length and area, and tubular connectors severally joining the radial shaft bores with the ports into the conductors for delivery thereto and discharge therefrom of liquid coolant.

References Cited in the file of this patent

UNITED STATES PATENTS

| | | |
|---|---|---|
| 865,617 | Steinmetz | Sept. 10, 1907 |
| 1,145,612 | Porter | July 6, 1915 |
| 2,618,756 | Fechheimer | Nov. 18, 1952 |
| 2,898,484 | Krastchew | Aug. 4, 1959 |